United States Patent
Li et al.

(10) Patent No.: US 12,358,174 B2
(45) Date of Patent: Jul. 15, 2025

(54) ULTRASONIC PRE-SURFACE AND POST-SURFACE PROCESSING FOR LASER BRAZING AND LASER WELDING

(71) Applicants: GM GLOBAL TECHNOLOGY OPERATIONS LLC, Detroit, MI (US); Northwestern University, Evanston, IL (US)

(72) Inventors: Guangze Li, Novi, MI (US); Hui-ping Wang, Troy, MI (US); Michael G. Poss, Rochester Hills, MI (US); Blair E. Carlson, Ann Arbor, MI (US); Ping Guo, Northfield, IL (US)

(73) Assignees: GM GLOBAL TECHNOLOGY OPERATIONS LLC, Detroit, MI (US); Northwestern University, Evanston, IL (US)

( * ) Notice: Subject to any disclaimer, the term of this patent is extended or adjusted under 35 U.S.C. 154(b) by 314 days.

(21) Appl. No.: 17/901,000

(22) Filed: Sep. 1, 2022

(65) Prior Publication Data
US 2024/0075645 A1   Mar. 7, 2024

(51) Int. Cl.
*B26D 7/08* (2006.01)
*B23K 1/20* (2006.01)
*B23K 3/08* (2006.01)
*B23K 26/21* (2014.01)
*B23K 26/70* (2014.01)
*B26D 3/28* (2006.01)

(52) U.S. Cl.
CPC ............. *B26D 7/086* (2013.01); *B23K 1/20* (2013.01); *B23K 3/08* (2013.01); *B23K 26/21* (2015.10); *B23K 26/702* (2015.10); *B26D 3/28* (2013.01)

(58) Field of Classification Search
CPC .......... B26D 7/086; B26D 3/28; B23K 26/21; B23K 26/702; B23K 1/20; B23K 3/08
See application file for complete search history.

(56) References Cited

U.S. PATENT DOCUMENTS

| | | |
|---|---|---|
| 9,586,282 B2 | 3/2017 | Yang |
| 10,086,469 B2 | 10/2018 | Li et al. |
| 10,195,689 B2 | 2/2019 | Yang et al. |
| 10,688,595 B2 | 6/2020 | Yang et al. |
| 11,191,281 B1* | 12/2021 | Foreman .................. B26D 7/08 |
| 11,992,931 B1* | 5/2024 | Foreman ............. B25J 11/0055 |
| 2006/0011592 A1* | 1/2006 | Wang ................... B23K 26/034 219/121.64 |
| 2015/0202718 A1 | 7/2015 | Yang et al. |
| 2016/0228991 A1* | 8/2016 | Ryan ...................... C22C 1/0433 |
| 2018/0207868 A1* | 7/2018 | Tyler ...................... B26D 7/086 |
| 2019/0030834 A1* | 1/2019 | Kuroda ................... B29B 11/16 |
| 2019/0143553 A1* | 5/2019 | Matsuno ............ B23Q 11/0032 225/93 |
| 2020/0101405 A1* | 4/2020 | Li ......................... G01N 21/952 |
| 2022/0203456 A1* | 6/2022 | Chen ...................... B22F 10/50 |
| 2022/0395927 A1* | 12/2022 | Bode-Mosig .......... B23K 37/00 |

(Continued)

*Primary Examiner* — Omar Flores Sanchez

(57) ABSTRACT

A laser brazing and welding system is disclosed and includes: a laser; a first cutting tool including a first cutting tip; and a control module. The control module is configured to control the laser to laser braze or laser weld two parts; and control ultrasonic vibration of the first cutting tip to remove one or more layers from at least one of the two parts prior to or subsequent to the laser brazing or laser welding of the two parts.

20 Claims, 8 Drawing Sheets

(56) References Cited

U.S. PATENT DOCUMENTS

2023/0090734 A1* 3/2023 Steinberg ................ B05B 7/228
2023/0150159 A1* 5/2023 Lupinetti ............... B26D 1/265
                                                                                         83/602

* cited by examiner

ULTRASONIC PRE-SURFACE AND POST-SURFACE PROCESSING FOR LASER BRAZING AND LASER WELDING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to laser brazing systems and laser welding systems.

Laser brazing is a process used to join two metal parts. A filler wire is fed into a gap between the two metal parts. A laser beam is provided to melt the filler wire and join the two metal parts without melting the two metal parts to provide a joint. The filler material is placed between faying surfaces of the two metal parts and then melted to provide liquified filler material. The liquid material fills a close-fitting gap between the two metal parts and then solidifies to join the two metal parts. As an example, one or both of the two metal parts may be formed of steel.

Laser welding is another process for joining two metal parts. A laser beam is provided to melt adjacent portions of the two metal parts and as a result joining the materials of the two metal parts. The mixing of the materials and solidification thereof joins the two metal parts. A filler wire may also be fed into the gap between the two metal parts during the heating and melting phase to further strengthen the resultant weld. The laser beam melts the filler wire in addition to the adjacent portions of the two metal parts. As an example, the two metal parts may be formed of aluminum.

SUMMARY

A laser brazing and welding system is disclosed and includes: a laser; a first cutting tool including a first cutting tip; and a control module. The control module is configured to control the laser to laser braze or laser weld two parts; and control ultrasonic vibration of the first cutting tip to remove one or more layers from at least one of the two parts prior to or subsequent to the laser brazing or laser welding of the two parts.

In other features, the first cutting tool further includes multiple transducers configured to move the first cutting tip. The control module is configured to control supply of power to the transducers to control the ultrasonic vibration of the first cutting tip.

In other features, the transducers are piezoelectric transducers.

In other features, the two parts include a first part and a second part. The first cutting tip is a dual cutting tip configured to cut the two parts concurrently. The control module is configured to control the ultrasonic vibration of the first cutting tip to concurrently remove a first layer from the first part and a second layer from the second part prior to or subsequent to the laser brazing or laser welding of the two parts, the one or more layers including the first layer and the second layer.

In other features, the laser brazing and welding system further includes at least one robot. The control module is configured to control the at least one robot to control position of the first cutting tool and the laser relative to the two parts during removal of the one or more layers from the at least one of the two parts prior and during the laser brazing or laser welding of the two parts.

In other features, the laser brazing and welding system further includes a second cutting tool including a second cutting tip. The control module is configured to i) control the ultrasonic vibration of the first cutting tip to remove the one or more layers from the at least one of the two parts prior to the laser brazing or laser welding of the two parts; and ii) control ultrasonic vibration of the second cutting tip to remove a second one or more layers from the at least one of the two parts subsequent to the laser brazing or laser welding of the two parts.

In other features, the first cutting tool further includes first transducers configured to move the first cutting tip. The second cutting tool further includes second transducers configured to move the second cutting tip. The control module is configured to control supply of power to i) the first transducers to control the ultrasonic vibration of the first cutting tip, and ii) the second transducers to control the ultrasonic vibration of the second cutting tip.

In other features, the first transducers and the second transducers are piezoelectric transducers.

In other features, the first cutting tip is a dual cutting tip configured to cut the two parts concurrently, the two parts including a first part and a second part. The second cutting tip is a dual cutting tip configured to cut the two parts concurrently. The control module is configured to i) control the ultrasonic vibration of the first cutting tip to remove a first layer from the first part and a second layer from the second part prior to the laser brazing or laser welding of the two parts, the one or more layers including the first layer and the second layer and ii) control the ultrasonic vibration of the second cutting tip to remove another layer from each of the two parts subsequent to the laser brazing or laser welding of the two parts.

In other features, the laser brazing and welding system further includes: a nozzle; and a pump connected to the nozzle. The control module is configured to control the pump to draw or blow particles formed during the removal of the one or more layers from the at least one of the two parts.

In other features, a laser brazing and welding system method is disclosed and includes: arranging two parts of an automotive vehicle to be joined relative to each other and relative to a laser brazing and welding assembly, the laser brazing and welding assembly including a laser and a first cutting tool, the first cutting tool includes a first cutting tip; controlling the laser to laser braze or laser weld two parts; and controlling ultrasonic vibration of the first cutting tip to remove one or more layers from at least one of the two parts prior to or subsequent to the laser brazing or laser welding of the two parts.

In other features, the laser brazing and welding method further includes controlling supply of power to multiple transducers of the first cutting tool to control the ultrasonic vibration of the first cutting tip.

In other features, the transducers are piezoelectric transducers.

In other features, the laser brazing and welding method further includes controlling the ultrasonic vibration of the first cutting tip to concurrently remove a first layer from a first part and a second layer from a second part prior to or subsequent to the laser brazing or laser welding of the two parts, the one or more layers including the first layer and the second layer, the two parts including the first part and the second part, and the first cutting tip is a dual cutting tip configured to cut the two parts concurrently.

In other features, the laser brazing and welding method further includes controlling position of the first cutting tool and the laser relative to the two parts during removal of the one or more layers from the at least one of the two parts prior and during the laser brazing or laser welding of the two parts.

In other features, the laser brazing and welding method further includes: controlling the ultrasonic vibration of the first cutting tip to remove the one or more layers from the at least one of the two parts prior to the laser brazing or laser welding of the two parts; and controlling ultrasonic vibration of a second cutting tip to remove a second one or more layers from the at least one of the two parts subsequent to the laser brazing or laser welding of the two parts, the laser brazing and welding assembly including a second cutting tool including the second cutting tip.

In other features, the laser brazing and welding method further includes controlling supply of power to i) first transducers to control the ultrasonic vibration of the first cutting tip, and ii) second transducers to control the ultrasonic vibration of the second cutting tip, the first cutting tool including the first transducers, and the second cutting tool including the second of transducers.

In other features, the first transducers and the second transducers are piezoelectric transducers.

In other features, the laser brazing and welding method further includes: controlling the ultrasonic vibration of the first cutting tip to remove a first layer from a first part and a second layer from a second part prior to the laser brazing or laser welding of the two parts, the one or more layers including the first layer and the second layer, the first cutting tip is a dual cutting tip configured to cut the two parts concurrently, and the two parts include the first part and the second part; and controlling the ultrasonic vibration of the second cutting tip to remove another layer from each of the two parts subsequent to the laser brazing or laser welding of the two parts, the second cutting tip is a dual cutting tip configured to cut the two parts concurrently.

In other features, the laser brazing and welding method further includes controlling a pump to draw or blow particles formed during the removal of the one or more layers from the at least one of the two parts.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

During manufacturing, metal sheets may be placed between a die and a punch, and then stamped to physically form (or shape) the metal sheets into parts. In order to protect the metal sheets and also die/punch during forming, the metal sheets may be coated with a thin layer of stamping lube. As an example, automotive steel roof panels are often laser brazed to steel body side outers. The steel roof panels have a coating layer of lubricant (e.g., oil) prior to and/or subsequent to forming in addition to an original coating material (e.g., zinc) to protect the steel roof panels from corrosion. The lubricant can also be helpful to prevent scratching during forming. During forming, metal surfaces can come in contact with other contaminants and/or loose small pieces of metal material (or metal fragments). The metal fragments can result from the rubbing of metal sheets against the die/punch surfaces. In addition, metal surfaces may be oxidized, such as aluminum surfaces, which quickly oxidize in ambient air. The presence of lubricants, contaminants and/or oxidized surfaces can hinder formation of strong joints (e.g., brazed joints or welded joints) and contribute to joint defects during brazing and welding. Oxidation, such as that resulting in an aluminum oxide layer, can cause joint porosity and low wettability of filler material on surfaces to be joined.

The examples set forth herein includes laser brazing and welding systems with ultrasonic vibrating pre-cleaning and post-polishing tools. The examples include the removal of thin layers of material in preparation for laser brazing and welding and the removal of additional thin layers of joints to provide polished joint surfaces.

Figure 1:
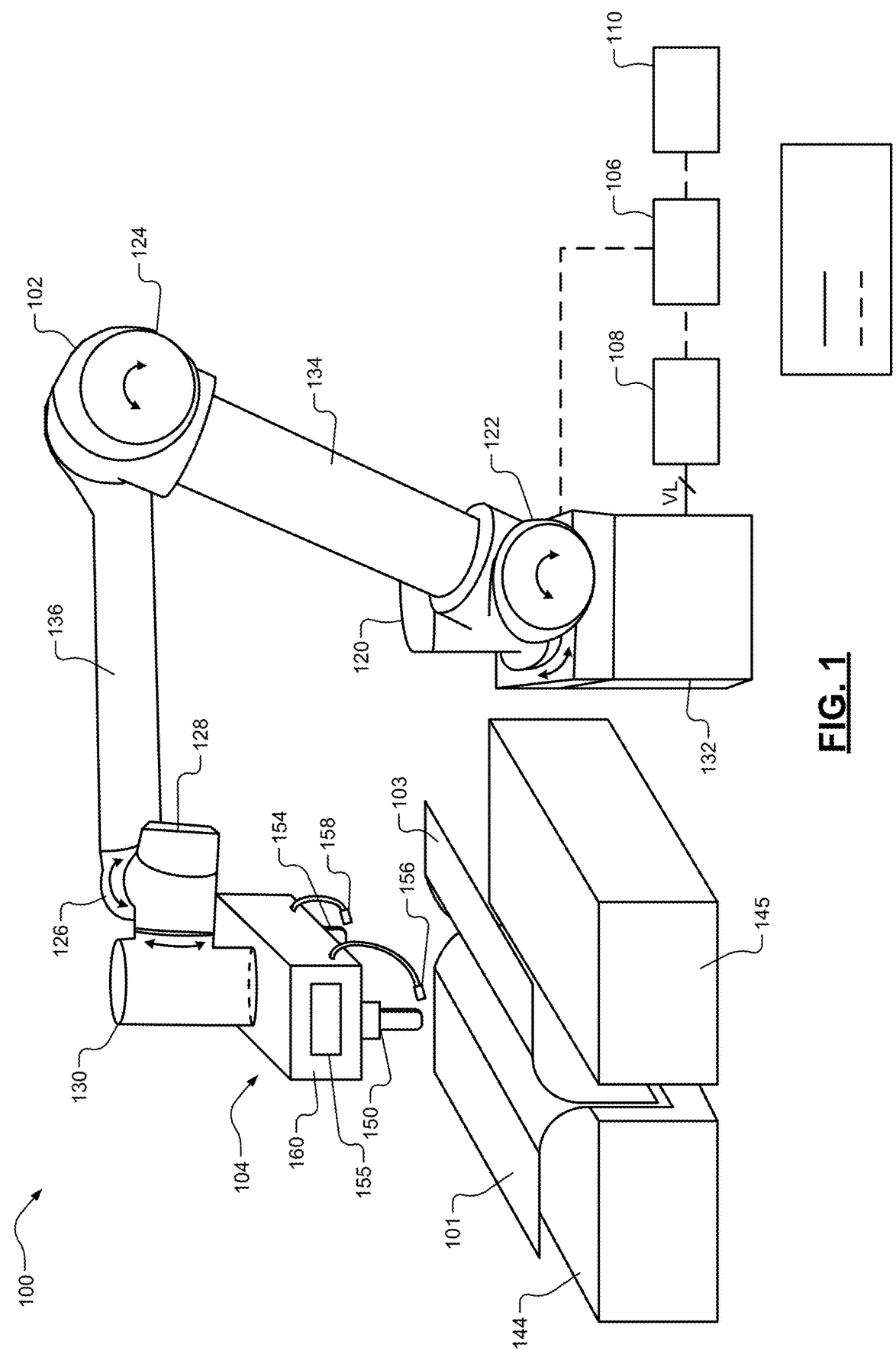
FIG. 1 is a perspective view and functional block diagram of an example laser brazing and welding system incorporating pre-cleaning and post-processing cutting tools in accordance with the present disclosure.

FIG. 1 shows an example laser brazing and welding system 100 incorporating pre-cleaning and post-processing cutting tools. The laser brazing and welding system 100 utilizes a first cutting tool tip that is ultrasonically vibrated to brush surfaces of metal parts (e.g., metal parts 101, 103) to be joined. The brushing includes cutting thin layers of material from surfaces of the metal parts. The removal of thin layers of surface material leaves clean and fresh surfaces (e.g., structural and/or panel surfaces) for subsequent brazing and welding. By providing clean/fresh surfaces, strong defect free bonds are able to be created. The laser brazing and welding system 100 also utilizes a second cutting tool tip that is ultrasonically vibrated to brush surfaces of resulting laser brazing or welding joints to provide polished joint surfaces.

The laser brazing and welding system 100 may include a robot 102, a laser brazing and welding tool assembly 104, a control module 106, a vacuum pump 108 and a power source 110. The control module 106 controls movement of the robot 102 and operation of the laser brazing and welding tool assembly 104. This includes controlling: cutting speeds; movement speed of the laser brazing and welding tool assembly 104 relative to one or more fixtures that are holding the metal parts; filler material feed rates; ultrasonic vibrating frequencies of cutting tools; vacuum pump ON and OFF times; and other parameters referred to below. Ultrasonic vibrating frequencies may include frequencies greater than or equal to 20 kilohertz (kHz).

The robot 102 may include multiple electric motors 120, 122, 124, 126, 128, 130 that provide six degrees of freedom including movement in X, Y, Z directions as well as rotational movement of the laser brazing and welding tool assembly 104. The robot 102 may be attached to a stand 132 as shown. Arms 134, 136 extend between the motors 122, 124, and 126. The control module 106 may control the robot 102 and the laser brazing and welding tool assembly 104 to braze or weld the parts 101, 103 that may be disposed on one or more fixtures, represented by blocks 144, 145.

Figure 2:
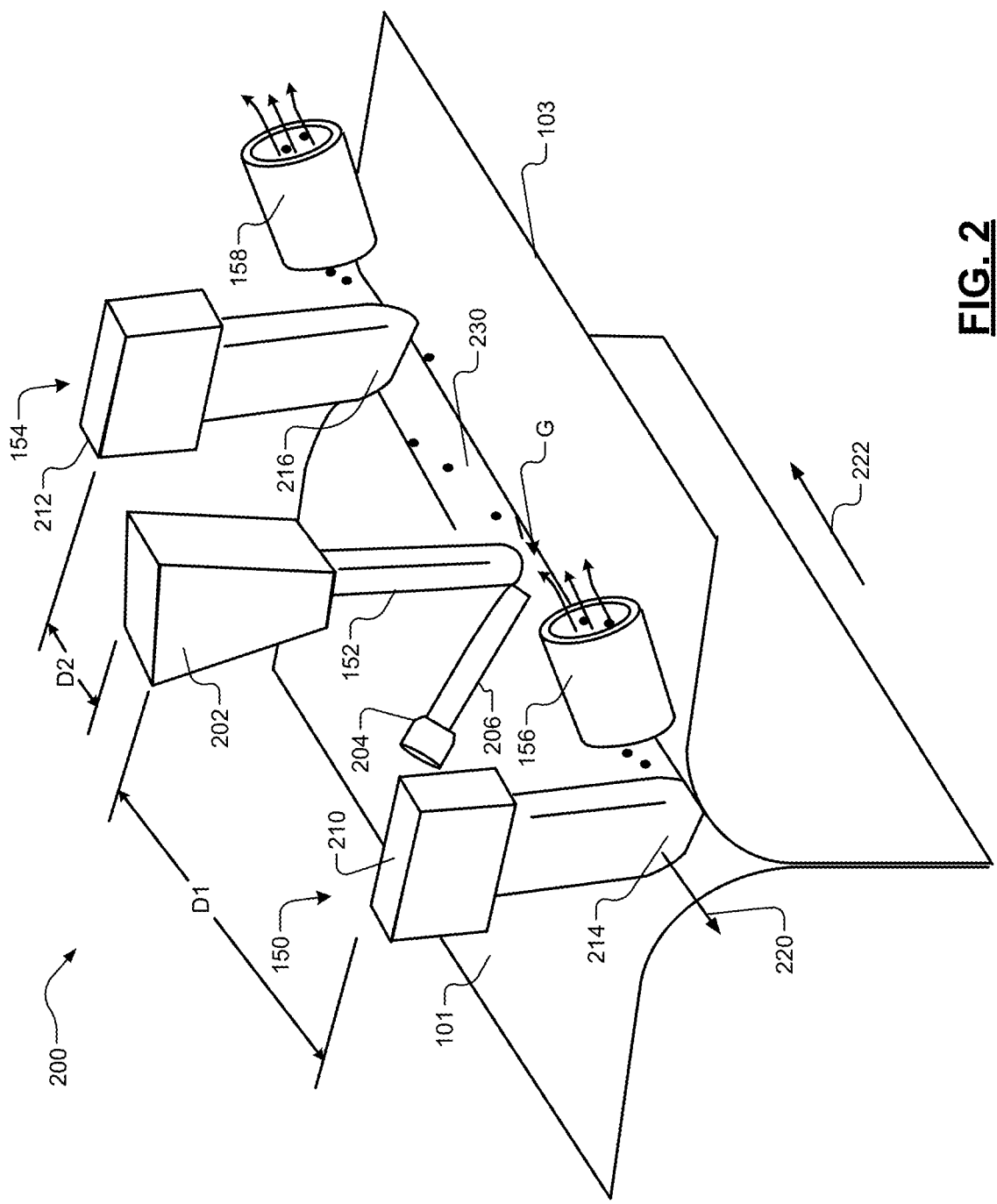
FIG. 2 is a perspective view of a portion of the laser brazing and welding system of FIG. 1.

The laser brazing and welding tool assembly 104 includes a pre-cleaning cutting tool 150, a laser providing a laser beam (an example laser beam 152 is shown in FIG. 2), a post-polishing cutting tool 154, and nozzles 156, 158, which may be mounted to a base 160. The base 160 may be mounted to the electric motor 130. Although not shown in FIG. 1, the base 160 may include motors and/or actuators for independent positioning and orienting of the cutting tools 150, 154 and the laser relative to each other and relative to the parts 101, 103.

A feed wire motor (FWM) 155 is also included to feed wire into a gap between the parts 101, 103 where the parts 101, 103 are to be brazed or welded together. Lines extend from the nozzles 156, 158 to the vacuum pump 108. The number of lines VL is shown in FIG. 1 extending from the vacuum pump 108 to the stand 132. The lines may be vacuum lines or air lines. In another embodiment, the vacuum pump 108 is replaced with an air pump to supply air to the nozzles 156, 158 to blow particles away from surfaces to be joined and/or joint surfaces. The laser brazing and welding tool assembly 104 is further described with respect to FIGS. 2-5 and 9. The control module 106 controls power supplied from the power source 110 to the pre-cleaning cutting tool 150, the laser providing a laser beam 152, and the post-polishing cutting tool 154.

The laser brazing and welding tool assembly 104 includes the cutting tools 150, 154 for: removing and cleaning surface materials on laser brazed and welded joint surfaces before brazing and welding, and ii) polishing the brazed and welded joint surfaces after laser brazing and welding. The cutting tools 150, 154 may be mounted on a robot arm or other moving device, as shown in FIG. 1, or on a fixture. When mounted on a robot arm or other moving device, the cutting tools 150, 154 perform cleaning, cutting and polishing while the robot arm or other moving device is moving the cutting tools 150, 154 along workpiece surfaces. The workpiece refers to the portions of the parts being joined. As an alternative example, the cutting tools 150, 154 may be mounted on a fixture such that the cutting tools 150, 154 remain stationary. In the example, the robot 102 or other moving device holds the workpiece and moves the workpiece with respect to the cutting tools 150, 154.

Figure 4:
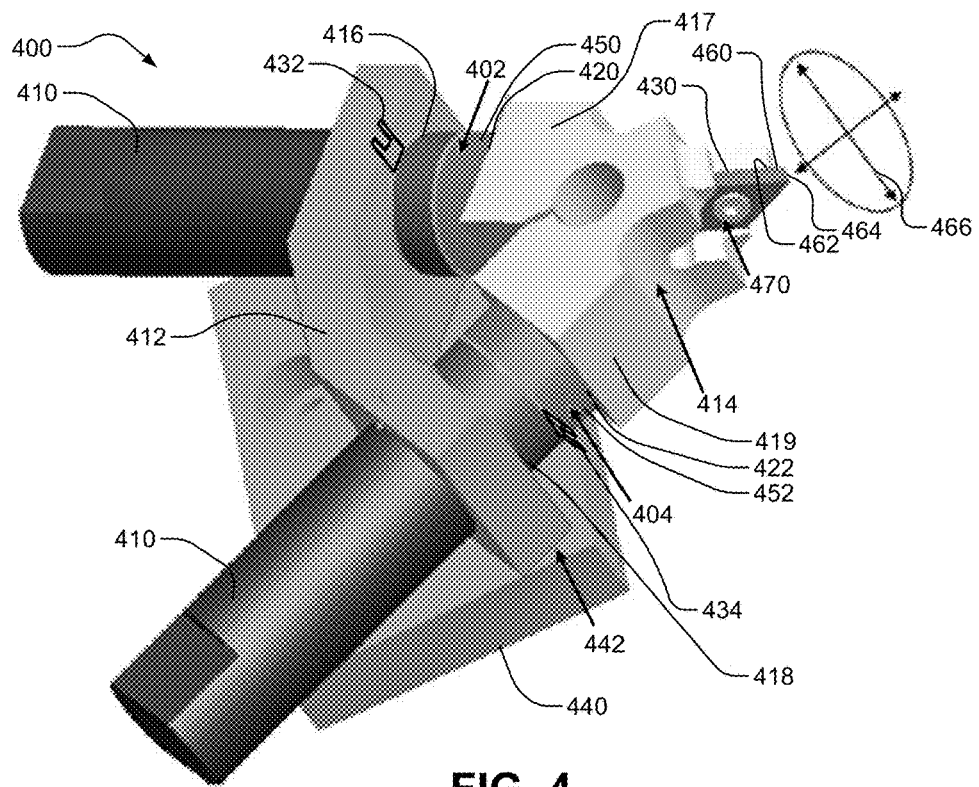
FIG. 4 is a perspective view of an example cutting tool assembly including transducers in accordance with the present disclosure.
Figure 5:
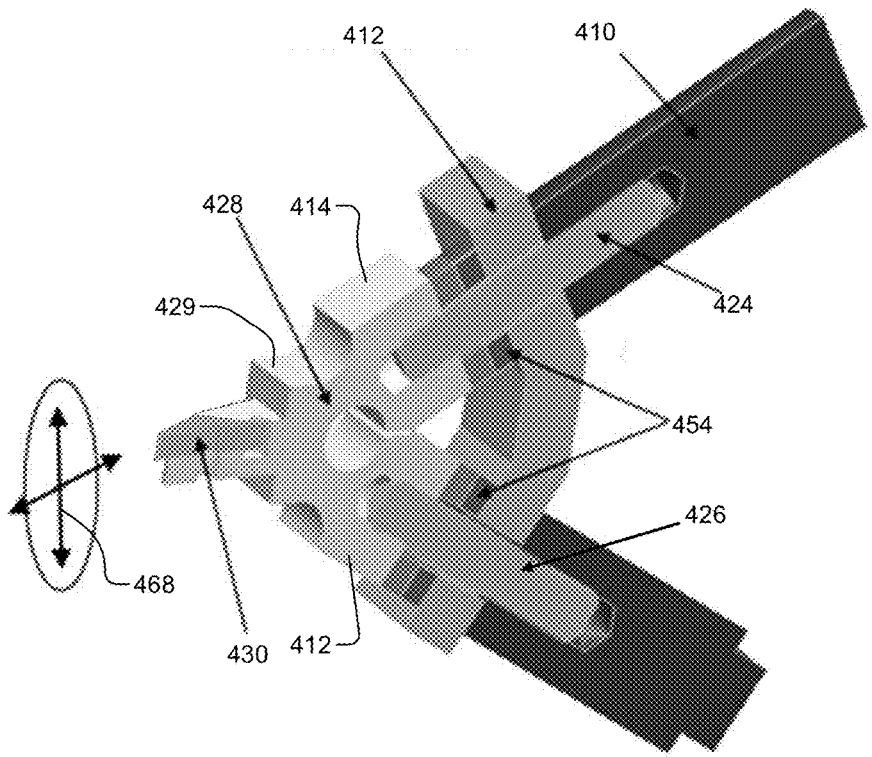
FIG. 5 is a cross-sectional view through the cutting tool assembly of FIG. 4.

FIG. 2 shows a portion 200 of the laser brazing and welding tool assembly 104 including the pre-cleaning cutting tool 150, a laser 202 providing the laser beam 152, the post-polishing cutting tool 154, and the vacuum nozzles 156, 158. The laser brazing and welding tool assembly 104 also includes a feeder wire nozzle 204 providing a feed wire 206. The cutting tools 150, 154 include head blocks 210, 212 and cutting tips 214, 216. The cutting tools 150, 154 are shown in FIGS. 1-2 as example representations and may be configured differently than shown. The cutting tools 150, 154 may each be configured with dual cutting edges, as shown, for cutting both of the parts 101, 103 concurrently. In an embodiment, each of the cutting tools 150, 154 includes dual cutting tips for concurrent cutting of the parts 101, 103. Another example, of a cutting tool is shown in FIGS. 4-5. The cutting tools 150, 154 may each be replaced with the cutting tools shown in FIGS. 4-5. Although the cutting tool shown in FIGS. 4-5 is shown having a single cutting tip, the cutting tool of FIGS. 4-5 may be modified to include a dual cutting tip. The laser 202 may include a light source, optics, etc.

During operation, the laser brazing and welding tool assembly 104 may be moved relative to the parts 101, 103 as represented by the arrow 220. In an alternative embodiment, the parts 101, 103 are moved relative to the laser brazing and welding tool assembly 104, as represented by arrow 222. The cutting tool 150 pre-cleans surfaces of the parts 101, 103 prior to brazing or welding as performed by the laser 202. The feed wire is fed into a gap G between the parts 101, 103 via the feed wire motor 155 of FIG. 1 and is melted by the laser beam 152. The laser beam 152 may melt the feed wire 206 and/or portions of the parts 101, 103 in the gap. The resultant solidified material provides the brazed or welded joint 230. The cutting tool 154 then polishes the brazed or welded joint 230. Particles that are formed as a result of the pre-cleaning and the post-polishing are vacuumed up by the vacuum nozzles 156, 158. The pre-cleaning and post-polishing operations are further described below.

The head block 210 may be a first predetermined distance ahead of the laser 202 and/or the cutting tip 214 may be the first predetermined distance ahead of the laser beam 152. This separates the cutting tip 214 and the corresponding cutting performed by the cutting tip from the area being brazed or welded by the laser beam 152. Similarly, the laser 202 may be a second predetermined distance ahead of the head block 212 and/or the laser beam 152 may be the second predetermined distance ahead of the cutting tip 216. The second predetermined distance may be the same or different than the first predetermined distance. In one embodiment, the second predetermined distance is less than the first predetermined distance. In another embodiment, the second predetermined distance is greater than the first predetermined distance. The first and second predetermined distances may be set based on: whether brazing or welding is being performed; whether filler material is being used; the types of filler material being used; the materials of the parts being joined; the distance required for the joints to cool down to a predetermined temperature; etc. Example first and second predetermined distances D1 and D2 are shown.

Figure 10:
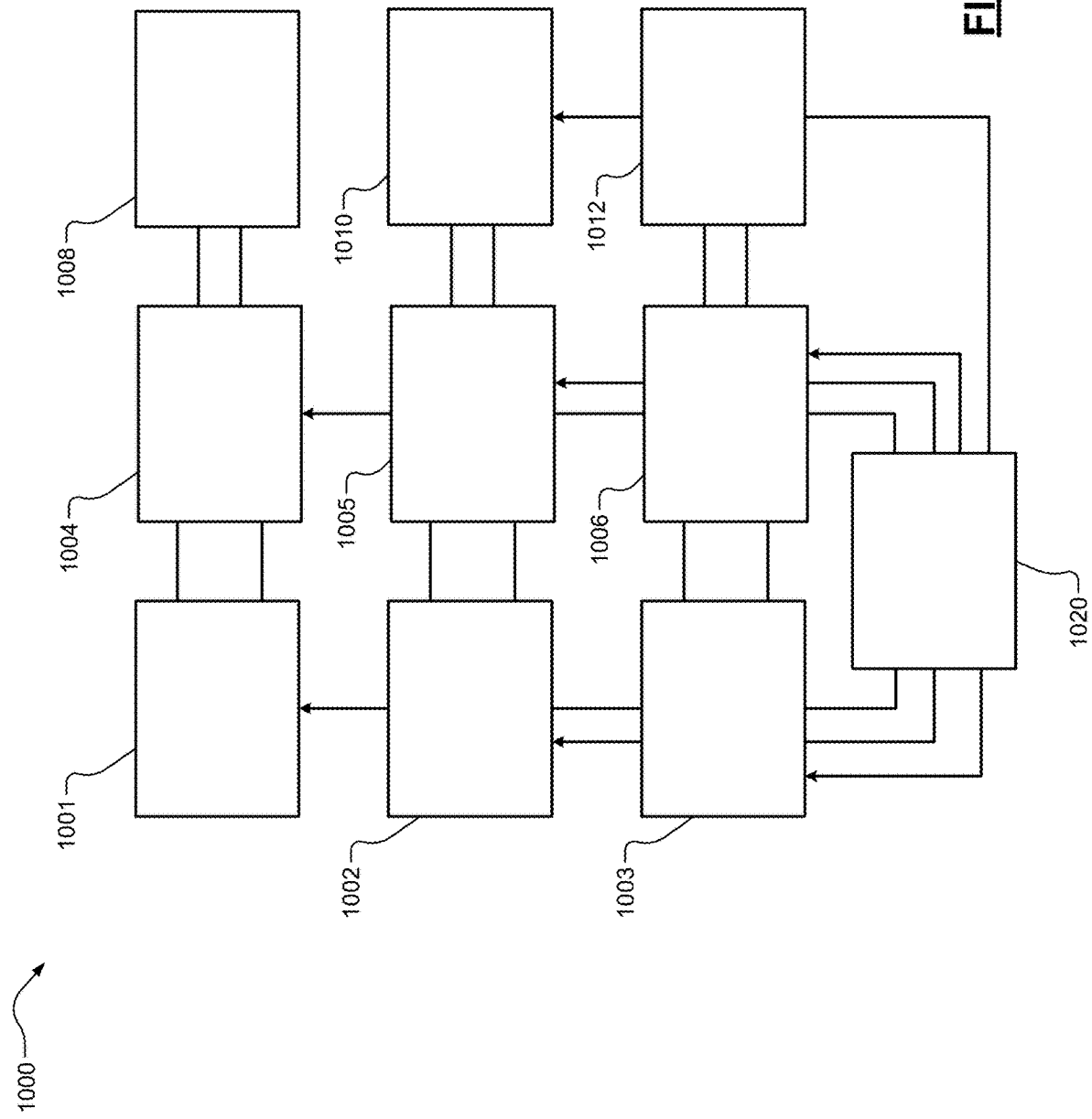
FIG. 10 is a functional block diagram of another example laser brazing and welding system incorporating pre-cleaning and post-processing cutting tools in accordance with the present disclosure.

The laser 202 and the head blocks 210, 212 may be connected to respective motor assemblies, control arms, robots, etc. for independent positioning and orienting of the laser 202 and the cutting tools 150, 154 including the head blocks 210, 212 and cutting tips 214, 216. The laser 202 and the head blocks 210, 212 may be connected to the same supporting structure as shown in FIG. 1 or may be connected to different supporting structures as shown in FIG. 10.

Figure 3:
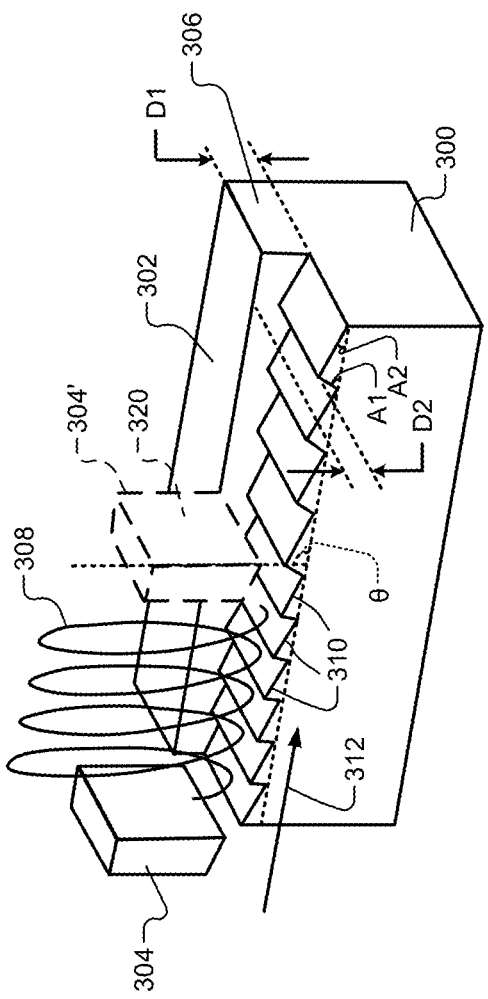
FIG. 3 is a perspective view of a portion of a workpiece (or part) with a surface and thin outer layer being cut away using an ultrasonic vibration cutting tool in accordance with the present disclosure.

FIG. 3 shows a portion 300 of a workpiece (or part) with a surface 302 and thin outer layer 306 being cut away using an ultrasonic cutting tool having a cutting tip 304. The cutting tip 304 may be configured as the cutting tip shown in FIGS. 1-2 and/or 4-5. The cutting tip 304 is vibrated in an oscillating pattern, as represented by elliptical pattern 308, along the surface 302 to remove at least the thin outer layer 306, which may be contaminated. The thin outer layer 306 may include lubricants, particles, oxidized material, etc.

Movement of the cutting tip 304 is controlled using piezoelectric transducers, examples of which are shown in FIGS. 4-5. The control module 106 of FIG. 1 controls voltages and/or current levels supplied to the piezoelectric transducers, thereby, controlling expansion and contraction of the piezoelectric transducers. Excitation of the transducers is small to provide an elliptical vibration. This controls movement of the cutting tip 304 in the elliptical pattern 308. This elliptical pattern 308 is referred to as elliptical vibration and forms a grating or "saw-tooth" pattern in the outer surface of the workpiece. The grating has a series of ridges 310 with upper edges and lower valleys. The elliptical movement allows the cutting tip 304 to remove up to, for example, 50 micrometers (μm) of material from the workpiece. The ultrasonic vibration removes surface material to predetermined depths. In one embodiment, the depths are tens to dozens of micrometers in size. Depth D1 in FIG. 3 refers to the depth of the lower valleys and depth D2 in FIG. 3 refers to the depth of the upper edges. As an example, the depth D1 may be less than or equal to 50 μm and the depth D2 may be less than or equal to 35 μm. The peak and valleys of the gratings are small. As another example, the valleys of the gratings or D1-D2 may be several hundred nanometers in size. From a macroscopic view, the roughness created by the gratings does not negatively affect a brazing and/or welding process. The control module 106 of FIG. 1 may also set and control the depths D1 and D2, the frequency of the elliptical pattern, the speed of cutting, and other parameters, such as cut angles A1 and A2 of the surfaces of the ridges 310. As an example, the speed of cutting may be up to 500 millimeters per second (mm/s). Arrow 312 refers to the normal cutting direction.

The cutting tip 304 is also shown in phantom, which is designated 304', over the workpiece to illustrate a rake angle θ. The rake angle θ is the angle between a rake surface 320 of the cutting tip 304' and the surface 302 of the workpiece. A clearance angle, a nose radius, rake surfaces and flank surfaces are referred to below with respect to FIGS. 4-6.

FIGS. 4-5 show a cutting tool assembly 400 including transducers 402, 404. The transducers 402, 404 are mounted at a set angle (e.g., 33°) relative to each other and between (i) end mass components including bars 410 and concave-shaped bracket 412, and (ii) a head block 414. The bars 410 extend through the concave-shaped bracket 412 and connect to first ends 416, 418 of the transducers 402, 404. The head block 414 is 'V'-shaped having two legs 417, 419 that are connected respectively to second ends 420, 422 of the transducers 402, 404. Bolts 424, 426 extend from being threaded in the bars 410 through the concave-shaped bracket 412 and the transducers 402, 404 and into the legs 417, 419 of the head block 414. The head block 414 has a central hole 428 that is between a main body 429 of the head block and the legs 417, 419. The legs 417, 419 are separated by a gap therebetween.

The head block 414 holds a cutting tool 430, such as any one of the cutting tools referred to herein. The transducers 402, 404 include connectors 432, 434 for connecting to the control module 106 of FIG. 1. The concave-shaped bracket 412 is connected to a base block 440 at 442. The base block 440 may have mounting holes to mount the base block 440 to a member of a cutting tool assembly.

The transducers 402, 404 may be piezoelectric sensors including lead zirconate titanate (PZT) rings 450, 452, 454, which expand and contract based on supplied current in directions of the head block 414. This expansion and contraction cause movement in the legs 417, 419, which is amplified at the head block 414, and as a result movement in the cutting tool 430. The movement is controlled by the control module 106 of FIG. 1.

The cutting tool 430 includes a rake surface 460, a cutting edge 462 and a flank surface 464. Arrow 466 refers to movement in a tangential direction. Arrow 468 refers to movement in a cutting direction. The cutting tool 430 may be formed of carbide, cubic boron nitride (CBN), high-speed steel (HSS), ceramic materials, polycrystalline diamond (PCD), polycrystalline CBN, and/or other suitable materials. The cutting tool may include an insert 470.

Figure 6:
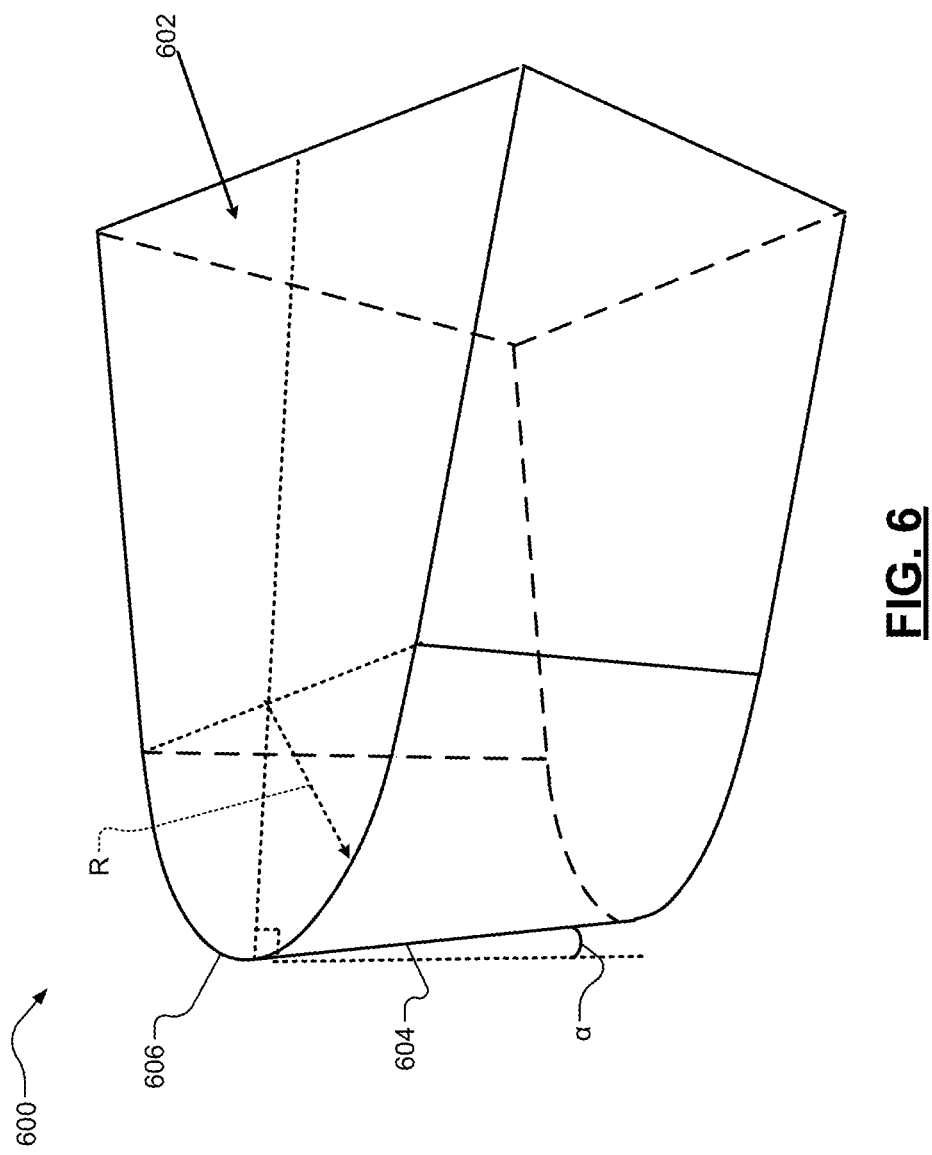
FIG. 6 is a perspective view of a portion of a cutting tool illustrating a clearance angle, a nose radius, a rake face and a flank face of a cutting tool.

FIG. 6 shows a portion 600 of a cutting tool illustrating a clearance angle α, a nose radius R, a rake face 602 and a flank face 604 of the cutting tool. Adjacent edges of the rake face 602 and the flank face 604 provides a cutting edge 606 for cutting material. As an example, the cutting tool has a tool tip as shown defined by the nose radius R. The nose radius R may be 100 μm-5 mm. The cutting tool and/or tool tip may be conformal to a shape of a surface to be cut.

Figure 7:
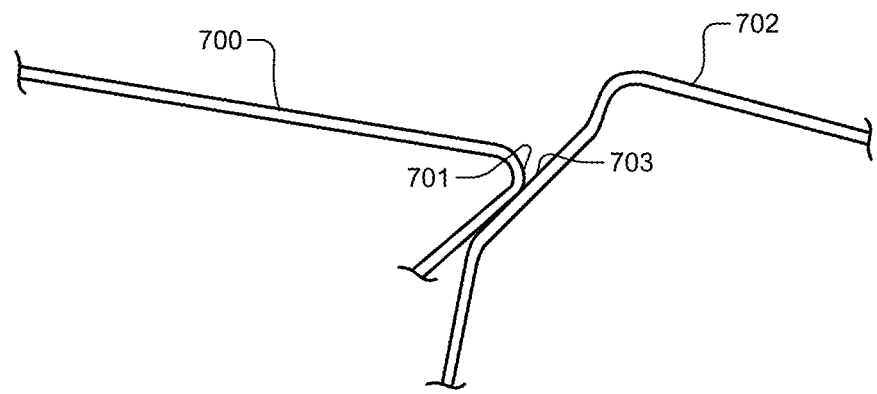
FIG. 7 is a side cross-sectional view of two metal parts to be joined.
Figure 8:
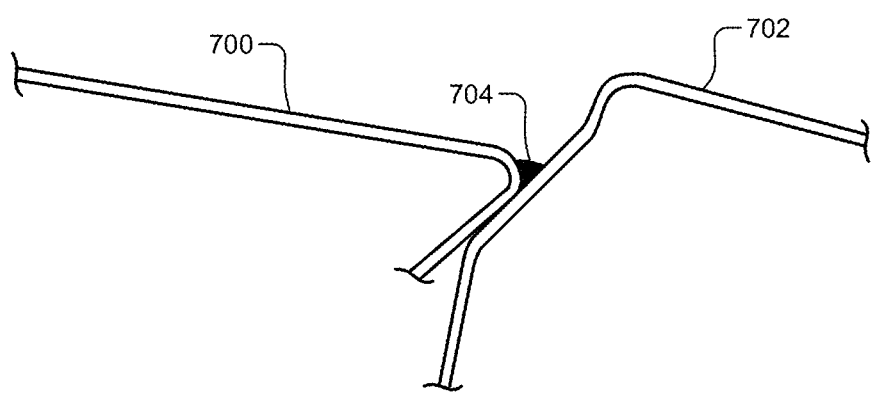
FIG. 8 is a side cross-section view of the two metal parts of FIG. 7 subsequent to be joined.

FIG. 7 shows two metal parts 700, 702 to be joined. The metal parts 700, 702 have respective surfaces 701, 703 to be joined. As an example, part 700 may be a body side structure of a vehicle and part 702 may be a roof of the vehicle. FIG. 8 shows the two metal parts 700, 702 subsequent to be joined, where a joint 704 has been formed. The joint may include filler material and/or materials of the parts 700, 702. The parts 700, 702 may be joined using the brazing and welding systems, assemblies and tools disclosed herein and the method of FIG. 9.

Figure 9:
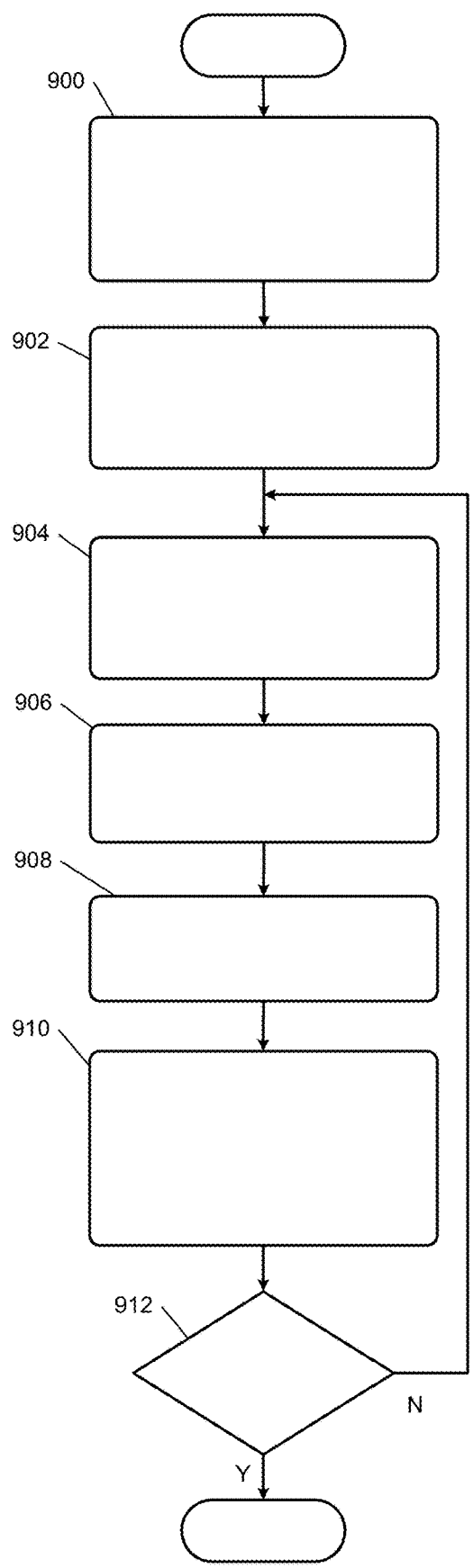
FIG. 9 illustrates a laser brazing and welding method with ultrasonic vibration pre-cleaning and ultrasonic vibration post-polishing in accordance with the present disclosure.

FIG. 9 shows a laser brazing and welding method with ultrasonic vibration pre-cleaning and ultrasonic vibration post-polishing. The method may be performed using the brazing and welding system of FIG. 1, the brazing and welding assembly of FIG. 2 and/or the assemblies of FIGS. 2 and 4-5. The following operations may be iteratively performed. One or more of the operations may be performed sequentially and/or concurrently.

At 900, the control module 106 determines and/or sets laser brazing or welding processing parameters including pre-surface (or pre-cleaning) processing parameters and post surface (or post-polishing) processing parameters. This may include determining start and end points of areas of two parts to be joined. The parameters may include: cutting speeds; oscillating frequencies; cutting depths; and/or angles; rake angles; cutting times; filler wire feed rates and ON and OFF times; laser voltages, current levels, and/or power levels; laser beam wavelengths; laser beam spot sizes; laser beam pulse widths; laser beam ON and OFF times; vacuum or air line pressures; and/or other parameters referred to herein. The following pre-cleaning, laser brazing or welding, and the post-polishing operations i) may each be continuously performed from the start point to the end point of the areas of the two parts to provide a single continuous brazed or welded joint, or ii) may each be performed in a segmented manner, such that there are two or more resultant brazed or welded joints between the start and end points. The ON and OFF times of the pre-cleaning occur before the ON and OFF times of the laser brazing and welding. The ON and OFF times of the laser brazing and welding occur before the ON and OFF times of the post-polishing. The OFF time of the pre-cleaning may occur prior to or after the ON time of the laser brazing and welding and/or the ON time of the post-polishing. The OFF time of the laser brazing and welding may occur prior to or after the ON time of the post-polishing.

At 902, the two parts that are to be joined are provided, placed, mounted, and/or positioned in one or more fixtures and/or on a robot relative to each other and relative to a cutting and joining tool.

At 904, the control module 106 begins or continues i) to move the parts relative to the cutting and joining tool, and/or ii) to move the cutting and joining tool relative to the robot.

At 906, the control module 106 performs a first ultrasonic cutting process to clean portions of surfaces of the parts to be joined. Each part may be ultrasonically cleaned in a sequential manner or concurrently, as performed during this method. The surface preparation/cleaning operation includes texturing the surfaces. An example of this is shown in FIG. 3.

At 908, the control module 106 laser brazes or welds the portions of the surfaces of the parts together to provide a joint with joint surfaces. When filler wire or other filler material is used, the joining of the surfaces may be referred to as adhesive bonding.

At 910, the control module 106 performs a second ultrasonic cutting process to clean the joint surfaces resulting from the laser brazing or welding of the portions of the surfaces of the parts. One or more of the joint surfaces may be ultrasonically cleaned in a sequential manner or concurrently, as performed during this method. The joint surfaces may include exposed surfaces of the joint and surfaces of the parts.

At 912, the control module 106 determines whether the joint has extended to the end of the part areas to be joined. If yes, the method ends, otherwise operation 904 may be performed.

FIG. 10 shows a laser brazing and welding system 1000 that includes multiple robots. Each of the robots may be configured and/or controlled similarly as the robot 102 of FIG. 1. As an example, robots 1001, 1002, 1003 are shown. The robots 1001, 1002, 1003 respectively support motor and actuator assemblies 1004, 1005, 1006, which are connected respectively to a first cutting tool 1008, a laser 1010, and a second cutting tool 1012. The motor and actuator assemblies 1004, 1005, 1006 may each include one or more motors and/or one or more actuators for independently positioning the cutting tools 1008, 1012 and the laser 1010.

The first cutting tool 1008, laser 1010, and second cutting tool 1012 may perform pre-cleaning, brazing/welding, and post-polishing operations and be configured similarly as other cutting tools and lasers referred to herein. The first cutting tool 1008, laser 1010 and second cutting tool 1012 may be independently moved relative to each other and relative to parts being worked on. This allows the first cutting tool 1008 and the second cutting tool 1012 to be positioned away from the laser 1010 and prevent dust from contaminating laser optics. This configuration also allows the first cutting tool 1008, laser 1010 and second cutting tool 1012 to be independently positioned relative to parts being worked on. The one or more supporting structures 1000 may include a control arm for each of the first cutting tool 1008, laser 1010 and second cutting tool 1012 to position each of the first cutting tool 1008, laser 1010 and second cutting tool 1012. A control module 1020 controls operation of the robots 1001, 1002, 1003 and the motors and actuators of the motor and actuator assemblies 1004, 1005, 1006. The control module 1020 also controls operation of the laser 1010.

The above-provided examples may be implemented on automotive related parts and/or other parts. The ultrasonic cutting tools may be used for surface preparation, processing and/or post-polishing in automotive manufacturing. The disclosed examples enable: quick panel and joint surface preparation/processing in automotive manufacturing and in other manufacturing environments; low costs for operation and maintenance; easy integration with a robot arm; high processing speeds; and precise control of cutting depths and cutting locations.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A cutting, laser brazing and welding system comprising:
   a laser;
   a first cutting tool comprising a first cutting tip; and
   a control module configured to
     control the laser to laser braze or laser weld two parts, and
     control ultrasonic vibration of the first cutting tip to remove one or more layers from at least one of the two parts prior to or subsequent to the laser brazing or laser welding of the two parts.

2. The cutting, laser brazing and welding system of claim 1, wherein the first cutting tool further comprises a plurality of transducers configured to move the first cutting tip,
   wherein the control module is configured to control supply of power to the plurality of transducers to control the ultrasonic vibration of the first cutting tip.

3. The cutting, laser brazing and welding system of claim 2, wherein the plurality of transducers are piezoelectric transducers.

4. The cutting, laser brazing and welding system of claim 1, wherein:
   the two parts comprise a first part and a second part;
   the first cutting tip is a dual cutting tip configured to cut the two parts concurrently; and
   the control module is configured to control the ultrasonic vibration of the first cutting tip to concurrently remove a first layer from the first part and a second layer from the second part prior to or subsequent to the laser brazing or laser welding of the two parts, the one or more layers comprising the first layer and the second layer.

5. The cutting, laser brazing and welding system of claim 1, further comprising at least one robot,
   wherein the control module is configured to control the at least one robot to control position of the first cutting tool and the laser relative to the two parts during removal of the one or more layers from the at least one of the two parts prior and during the laser brazing or laser welding of the two parts.

6. The cutting, laser brazing and welding system of claim 1, further comprising a second cutting tool comprising a second cutting tip,
   wherein the control module is configured to i) control the ultrasonic vibration of the first cutting tip to remove the one or more layers from the at least one of the two parts prior to the laser brazing or laser welding of the two parts; and ii) control ultrasonic vibration of the second cutting tip to remove a second one or more layers from the at least one of the two parts subsequent to the laser brazing or laser welding of the two parts.

7. The cutting, laser brazing and welding system of claim 6, wherein:
the first cutting tool further comprises a first plurality of transducers configured to move the first cutting tip; and
the second cutting tool further comprises a second plurality of transducers configured to move the second cutting tip,
wherein the control module is configured to control supply of power to i) the first plurality of transducers to control the ultrasonic vibration of the first cutting tip, and ii) the second plurality of transducers to control the ultrasonic vibration of the second cutting tip.

8. The cutting, laser brazing and welding system of claim 7, wherein the first plurality of transducers and the second plurality of transducers are piezoelectric transducers.

9. The cutting, laser brazing and welding system of claim 6, wherein:
the first cutting tip is a dual cutting tip configured to cut the two parts concurrently, the two parts comprising a first part and a second part;
the second cutting tip is a dual cutting tip configured to cut the two parts concurrently; and
the control module is configured to i) control the ultrasonic vibration of the first cutting tip to perform the cutting of the two parts to remove a first layer from the first part and a second layer from the second part prior to the laser brazing or laser welding of the two parts, the one or more layers comprising the first layer and the second layer and ii) control the ultrasonic vibration of the second cutting tip to perform the cutting of the two parts to remove another layer from each of the two parts subsequent to the laser brazing or laser welding of the two parts.

10. The cutting, laser brazing and welding system of claim 1, further comprising:
a nozzle; and
a pump connected to the nozzle,
wherein the control module is configured to control the pump to draw or blow particles formed during the removal of the one or more layers from the at least one of the two parts.

11. A cutting, laser brazing and welding system method comprising:
arranging two parts of an automotive vehicle to be joined relative to each other and relative to a cutting, laser brazing and welding assembly, the cutting, laser brazing and welding assembly comprising a laser and a first cutting tool, the first cutting tool comprises a first cutting tip;
controlling the laser to laser braze or laser weld two parts; and
controlling ultrasonic vibration of the first cutting tip to remove one or more layers from at least one of the two parts prior to or subsequent to the laser brazing or laser welding of the two parts.

12. The cutting, laser brazing and welding method of claim 11, further comprising controlling supply of power to a plurality of transducers of the first cutting tool to control the ultrasonic vibration of the first cutting tip.

13. The cutting, laser brazing and welding method of claim 12, wherein the plurality of transducers are piezoelectric transducers.

14. The cutting, laser brazing and welding method of claim 11, further comprising controlling the ultrasonic vibration of the first cutting tip to concurrently remove a first layer from a first part and a second layer from a second part prior to or subsequent to the laser brazing or laser welding of the two parts, the one or more layers comprising the first layer and the second layer, the two parts comprising the first part and the second part, and the first cutting tip is a dual cutting tip configured to cut the two parts concurrently.

15. The cutting, laser brazing and welding method of claim 11, further comprising controlling position of the first cutting tool and the laser relative to the two parts during removal of the one or more layers from the at least one of the two parts prior and during the laser brazing or laser welding of the two parts.

16. The cutting, laser brazing and welding method of claim 11, further comprising:
controlling the ultrasonic vibration of the first cutting tip to remove the one or more layers from the at least one of the two parts prior to the laser brazing or laser welding of the two parts; and
controlling ultrasonic vibration of a second cutting tip to remove a second one or more layers from the at least one of the two parts subsequent to the laser brazing or laser welding of the two parts, the cutting, laser brazing and welding assembly comprising a second cutting tool comprising the second cutting tip.

17. The cutting, laser brazing and welding method of claim 16, further comprising controlling supply of power to i) a first plurality of transducers to control the ultrasonic vibration of the first cutting tip, and ii) a second plurality of transducers to control the ultrasonic vibration of the second cutting tip, the first cutting tool comprising the first plurality of transducers, and the second cutting tool comprising the second plurality of transducers.

18. The cutting, laser brazing and welding method of claim 17, wherein the first plurality of transducers and the second plurality of transducers are piezoelectric transducers.

19. The cutting, laser brazing and welding method of claim 16, further comprising:
controlling the ultrasonic vibration of the first cutting tip to perform the cutting of the two parts to remove a first layer from a first part and a second layer from a second part prior to the laser brazing or laser welding of the two parts, the one or more layers comprising the first layer and the second layer, the first cutting tip is a dual cutting tip configured to cut the two parts concurrently, and the two parts comprise the first part and the second part; and
controlling the ultrasonic vibration of the second cutting tip to perform the cutting of the two parts to remove another layer from each of the two parts subsequent to the laser brazing or laser welding of the two parts, the second cutting tip is a dual cutting tip configured to cut the two parts concurrently.

20. The cutting, laser brazing and welding method of claim 11, further comprising controlling a pump to draw or blow particles formed during the removal of the one or more layers from the at least one of the two parts.

* * * * *